(12) United States Patent
Kadrnoska et al.

(10) Patent No.: US 6,997,646 B2
(45) Date of Patent: Feb. 14, 2006

(54) CABLE GUIDE AND METHOD FOR PRODUCING THE SAME

(75) Inventors: Helmut Kadrnoska, Vienna (AT); Gerhard Reiss, Laxenburg (AT); Bernhard Ogris, Pfaffstätten (AT)

(73) Assignee: Wien Kanal-Abwassertechnologien GesMbH, Vienna (AT)

( * ) Notice: Subject to any disclaimer, the term of this patent is extended or adjusted under 35 U.S.C. 154(b) by 0 days.

(21) Appl. No.: 10/474,413

(22) PCT Filed: Apr. 4, 2002

(86) PCT No.: PCT/AT02/00103

§ 371 (c)(1),
(2), (4) Date: Dec. 29, 2003

(87) PCT Pub. No.: WO02/082610

PCT Pub. Date: Oct. 17, 2002

(65) Prior Publication Data

US 2004/0170476 A1    Sep. 2, 2004

(30) Foreign Application Priority Data

Apr. 9, 2001    (AT) ............................... A 575/2001

(51) Int. Cl.
*H02G 9/06*    (2006.01)
(52) U.S. Cl. ................. 405/183.5; 405/184; 405/184.4
(58) Field of Classification Search ............ 405/183.5, 405/187.1, 189.4
See application file for complete search history.

(56) References Cited

U.S. PATENT DOCUMENTS

| | | | |
|---|---|---|---|
| 4,647,251 A | * | 3/1987 | Gale ....................... 405/184.4 |
| 6,527,478 B1 | * | 3/2003 | Finzel et al. ............. 405/184.4 |
| 6,604,890 B1 | | 8/2003 | Tresch |
| 6,712,556 B1 | * | 3/2004 | Penza ...................... 405/183.5 |
| 2002/0113434 A1 | | 8/2002 | Tresch |
| 2003/0021633 A1 | * | 1/2003 | Seto et al. ................. 405/174 |

FOREIGN PATENT DOCUMENTS

| | | |
|---|---|---|
| DE | 298 02 655 U1 | 5/1998 |
| DE | 299 16 731 U1 | 5/2000 |
| DE | 199 21 382 A1 | 8/2000 |
| DE | 199 20 459 A1 | 1/2001 |
| EP | 1 085 360 A1 | 3/2001 |
| JP | 2002-122768 * | 4/2002 |

* cited by examiner

*Primary Examiner*—Frederick L. Lagman
(74) *Attorney, Agent, or Firm*—Laurence A. Greenberg; Werner H. Stemer; Ralph E. Locher

(57) ABSTRACT

When a glass fiber cable emerging from a main channel (1) is guided into a domestic channel line (2), in order to prevent this glass fiber cable from unacceptably having an excessively small radius of curvature in the direction-changing area (6), and thus being damaged, and in order to ensure that the glass fiber cable (3) is in the correct position, this glass fiber cable (3) is guided in a rigid guide tube (7) whose longitudinal axis runs essentially along a cylindrical envelope surface in its central section (7'''). The rigid guide tube (7) is fixed in a pipe connecting stub (10) which can be widened elastically and thus, after insertion into the domestic channel line (2), rests on the wall thereof in a stressed manner, and is fixed in its position. That end of the guide tube (7) which projects into the domestic channel line (2) is connected via a sleeve (8) to a flexible pipe, tube (5) or the like. The glass fiber cable is passed from a switching box (4) via the rigid guide tube (7) and the flexible tube (5) to a building which is located on a piece of land and is connected to the domestic channel line (2).

25 Claims, 6 Drawing Sheets

CABLE GUIDE AND METHOD FOR PRODUCING THE SAME

BACKGROUND OF THE INVENTION

FIELD OF THE INVENTION

The invention relates to a cable guide as claimed in the precharacterizing clause of claim 1, and to a method for producing such a cable guide.

It is known for sewage channels to be used for laying cable lines, since this results in the advantage that it is possible to largely avoid digging work. For this purpose, cable racks or similar supporting devices for the cables to be laid are mounted in the area of the arch of the main water channel, which generally has an egg-shaped profile. The main cables used in this context are glass fiber cables which, when laid retrospectively, can transport large amounts of data.

DE 19920459 A1 discloses an apparatus by means of which an optical waveguide cable is supplied to a channel system via a vertical shaft which allows access to this channel system. In order to ensure compliance with the minimum permissible cable bending ratio, this known apparatus is provided with a flexible tubular sheath, which surrounds the cable, in the direction-changing area from the shaft to the channel system. The cable end projecting out of the sheath is connected via a terminal to a clamping apparatus, with the clamping force being chosen such that the bending radius is not less than the minimum permissible bending radius. In order to ensure that the cable and the sheath surrounding this cable do not project into the channel in the direction-changing area, it is necessary to incline the transitional point between the shaft wall and the channel wall, which necessitates a considerable additional labour cost in the channel through which the sewage flows, and causes undesirable damage to the channel wall, with the risk of a leak being formed there. Furthermore, this removal of material from the channel wall adversely effects the static strength.

DE 29802655 U1 discloses a protection apparatus for optical waveguide cables, in which a direction-changing element which has a groove that holds the cable is provided in the direction-changing area between the wall of a vertical inspection shaft and the channel wall. Although no provision is made in this known design to incline the corner which the shaft wall forms with the channel, the direction-changing element does, however, project well into the shaft, as a consequence of the curvature that is required to comply with the minimum permissible cable bending radius. No such design is feasible in the opening of a domestic channel line into a main channel since floating material carried by the contaminated water will become attached to the direction-changing element there, thus not only resulting in a risk of damage to the cable, but also the possibility of partial blocking of the channel cross section.

When cable lines are being laid to pieces of land with premises requiring connections to the cable network, via a domestic channel line which branches off from a main channel, opens approximately at right angles into the main channel and has a maximum diameter of only 500 mm, or frequently even less, the radius of curvature must not be less than a specific minimum radius of curvature in the direction-changing area, in order to avoid damage to the glass fiber cables. Until now, in the same way as when supplying cables via a shaft into a channel, it has been necessary to partially remove the channel wall in the direction-changing area or to allow a cable loop to project into the domestic channel line, resulting in the already mentioned disadvantages.

The present invention is therefore based on the object of avoiding these disadvantages and of providing a cable guide for a cable, in particular a glass fiber cable, in a direction-changing area, that is to say in an area where a domestic channel line branches off from a main channel, which can be produced and installed in a simple manner and in which, in particular, the existing channel wall need not be machined and is thus not damaged or weakened either. Against the background of a cable guide on a channel mouth, having a guide tube which holds the cable in the area of this channel mouth, the invention proposes that, in order to achieve this object, the guide tube be rigid, with the longitudinal axis of the guide tube being arranged along the envelope surface of a cylinder at least in the central section which runs in the direction-changing area, the axis of which cylinder runs in the longitudinal direction of the channel mouth, and that that end area of the guide tube which is located in the channel mouth be connected to a flexile guide element, such as a flexible tube, a flexible pipe or the like, which is known per se and holds the cable.

Since the cable is held by the rigid guide tube in the direction-changing area, the cable is forced to adopt a specific profile corresponding to the shape of this rigid guide tube in which case, since the central section of this rigid guide tube runs along the cylindrical envelope surface in the form of a three-dimensional curve, this ensures that, on the one hand, the radius of curvature is not less than the required minimum radius of curvature, while, on the other hand, this avoids the cable and the guide tube and guide element which surround the cable from projecting into the main channel and into the channel mouth. The rigid guide tube is preferably shaped appropriately on a template in order to comply with the conditions that have been mentioned. The cable is guided in the normal manner in the channel mouth in a guide element which is formed by a flexible pipe, tube or the like and which must be connected to the end of the rigid guide tube. For this purpose, the end of the guide element is, according to the invention, provided with a preferably integrally formed sleeve, which holds the end area of the rigid guide tube.

A further important feature for the cable guide according to the invention is the point at which the cable emerges from the rigid guide tube at its ends, because this should be a point located well away from the base of the channel system in order that the cable does not form an obstruction to the flow of the contaminated water. For this reason, it is advantageous for the central section of the rigid guide tube, which runs essentially along a cylindrical envelope surface, to be attached to a pipe connecting stub, within said pipe connecting stub, which rests on the wall of the channel mouth, that is to say of the domestic channel line. An optimum cable position is achieved if the rigid guide tube is positioned in the pipe connecting stub such that its other end area runs approximately at right angles to the longitudinal axis of the pipe connecting stub, and preferably approximately tangentially with respect to the circumference of the pipe connecting stub, while, in contrast, the end area which is located in the channel mouth runs approximately parallel to the longitudinal axis of the pipe connecting stub. The pipe connecting stub together with the rigid guide tube which is fixed in it can in this case be positioned in the channel mouth such that the end areas of this guide tube assume the optimum position as mentioned. In this case, the pipe connecting stub can preferably be widened elastically so that, after being inserted into the channel mouth, it is pressed by the elasticity against the channel wall, so that there is no need for any additional measures for fixing the pipe connecting stub in the required position. The pipe connecting stub is preferably formed from a metal sheet which is slotted in the axial direction and is curved with respect to the pipe connecting stub so as to ensure the required elastic expansion capability.

As already mentioned, the rigid guide tube is expediently bent to the desired shape on a template, and it then retains this shape. The rigid guide tube may in this case be formed from plastic or from metal. The rigid guide tube is preferably, however, formed from a metal/plastic composite tube, which results in the advantage that this ensures that it can be deformed easily, while the shape that has been formed is subsequently retained.

As already mentioned, the central section of the rigid guide tube is attached to the inner wall of the pipe connecting stub. Clamps, cable ties or the like can be provided for this purpose on the inner wall of the pipe connecting stub.

A further requirement for the cable guide according to the invention is that the guide element which holds the cable and is located in the channel mouth, that is to say in the domestic channel line, is located in the area of the top of the domestic channel line, and thus does not impede the flow of the sewage. Care must therefore be taken to ensure that this guide element is fixed at the point that has been mentioned in the domestic channel line, which generally has a maximum diameter of 500 mm. A flexible cladding tube which rests on the wall of the channel mouth and fixes the guide element on this wall is provided for this purpose adjacent to the pipe connecting stub. This flexible cladding tube may be impregnated with a synthetic resin, which can be cured, preferably by supplying heat. In this case, once the flexible cladding tube has been pressed against the wall of the channel mouth, the flexible tube is solidified by the curing of the synthetic resin and, in consequence, the guide element is supported on the channel wall.

The method according to the invention for the production of a cable guide for a cable, in particular a glass fiber cable, which is guided in a channel system, preferably a sewage channel system, in the direction-changing area on a channel mouth, consists in that a flexible guide element, such as a flexible pipe, a flexible tube or the like, which originates from the direction-changing area is first of all inserted into the channel mouth, in that the end of this guide element is connected to a rigid guide tube which has been deformed such that its longitudinal axis in the central section runs essentially along an imaginary cylindrical envelope surface, in that this rigid guide tube then is fixed on the inside of a pipe connecting stub which can be widened elastically, after which the pipe connecting stub is then inserted, with the rigid guide tube fixed to it, into the channel mouth from the direction-changing area such that the pipe connecting stub rests in a stressed manner on the wall of the channel mouth and the rigid guide tube emerges from the pipe connecting stub into the channel system approximately tangentially in the area of the upper boundary of this pipe connecting stub, following which the cable is drawn into the guide tube and its guide element which is connected to it. This results in a cable guide being produced in a simple manner, in which the cable assumes the required position in the direction-changing area and, in particular, is not unacceptably bent.

In a further method step, a flexible cladding tube is inserted through the pipe connecting stub into the channel mouth with the flexible cladding tube being pressed against the wall of the channel mouth and against the guide element which runs along this wall, and being fixed in this pressed-on position by supplying a pressure medium, preferably pressurized water, into the flexible tube interior. In consequence, the guide element is fixed in position in the channel system in the desired manner.

The flexible cladding tube which is impregnated with a synthetic resin that can be cured, is fixed by supplying a heated medium, in particular heated water, into the flexible tube interior, thus resulting in the curing process taking place, and the flexible tube being solidified.

BRIEF DESCRIPTION OF THE DRAWINGS

The cable guide according to the invention is illustrated schematically in the drawing.

DESCRIPTION OF THE PREFERRED EMBODIMENTS

Figure 1:
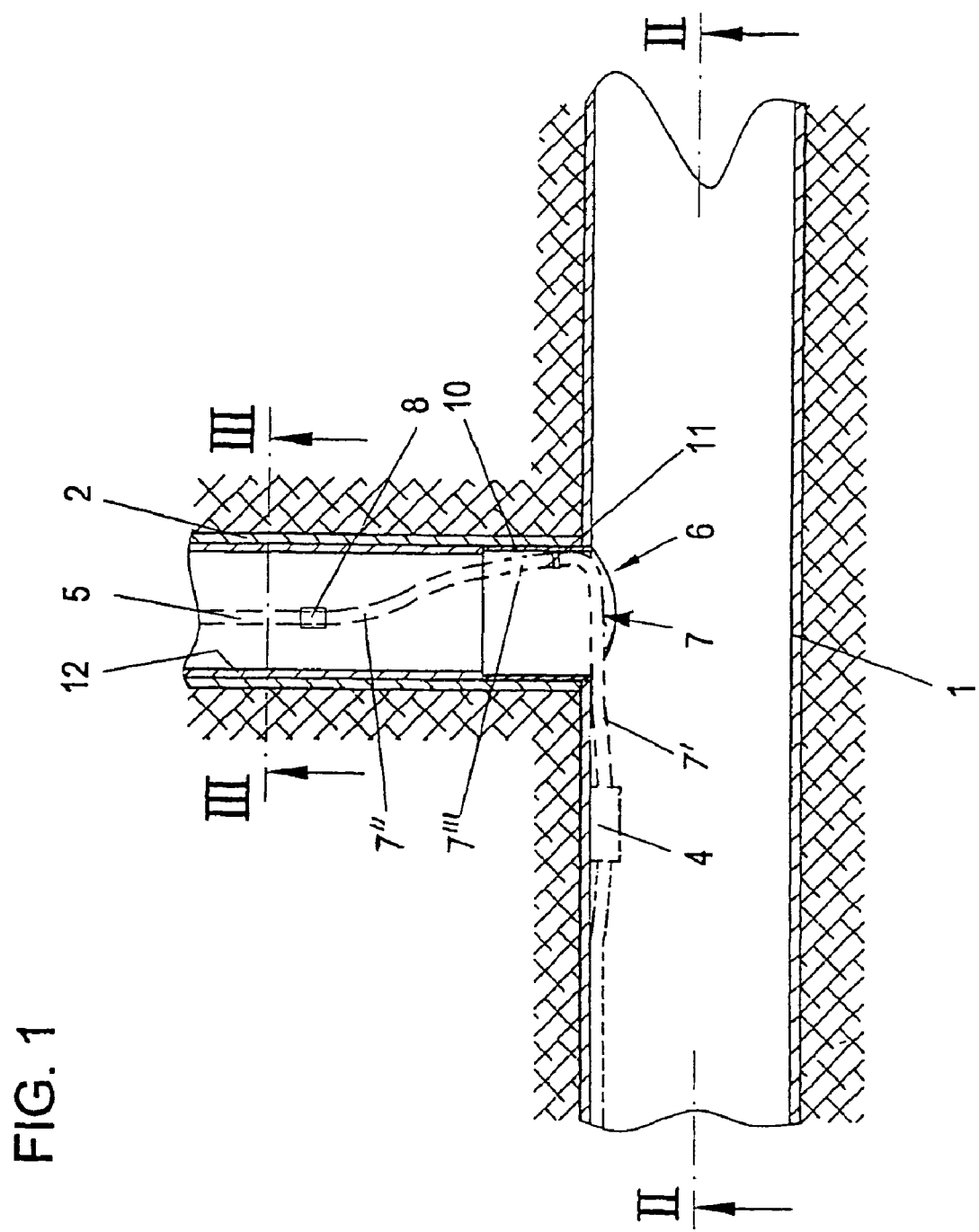
FIG. 1 shows a horizontal section through a channel system.

The sewage channel system that is illustrated in FIG. 1 has a main channel 1, from which a domestic channel line 2 branches off. A support, which is not illustrated, for the glass fiber cable that is passed through this main channel is located, for example, in an arch of the main channel 1, which has an egg-shaped cross section. A glass fiber cable 3 is intended to be passed from this as a branch via the domestic channel line 2 to a building that is located on a piece of land. The branch is produced via a distribution box 4 which is attached to the wall of the main channel 1.

Figure 3:
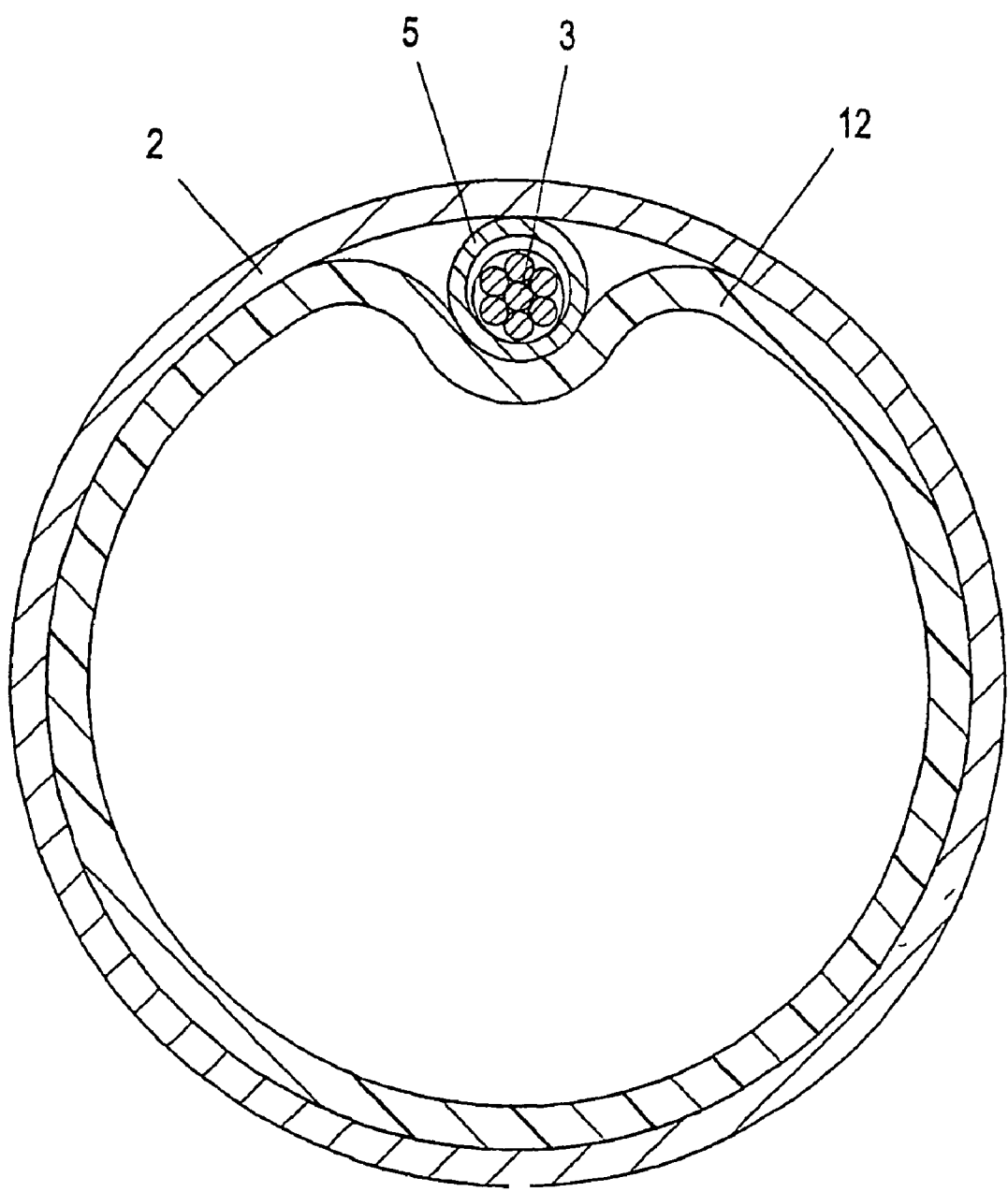
FIG. 3 shows a section along the line III—III in FIG. 1.

As can be seen from FIG. 3, the glass fiber cable 3 is guided in a guide element 5 which is formed from a tube, a flexible tube or the like and is arranged in the manner which will be described in more detail in the following text at the top of the domestic channel line in order that the base of this domestic channel line 2, which carries the sewage, is kept free.

A rigid guide tube 7 for the glass fiber cable 3 is provided in the direction-changing area 6, that is to say in that area where the glass fiber cable 3 coming from the main channel 1 opens into the domestic channel line 2, and is connected in a liquid-tight manner at one of its ends to this guide element 5 via a sleeve 8 which is integrally formed on the guide element 5, and opens at its other end into the distribution box 4. The central section 7''' of the rigid guide tube 7 runs essentially along the envelope surface of a cylinder, and is thus shaped such that the glass fiber cable which is held by this guide tube 7 is not subjected to any unacceptable kinking loads, and assumes the desired position with respect to the channel system. In order to secure this position, the rigid guide tube 7 is fixed on the inside of a pipe connecting stub 10 via cable ties 11 or other attachment devices. The pipe connecting stub 10 can be widened elastically and is formed from a metal sheet (see FIG. 4) which is slotted in the axial direction and is curved such that, after being inserted into the domestic channel line 2, it rests on the channel wall in a stressed manner, and is thus fixed in its position. The pipe connecting stub 10 is inserted into the domestic channel line 2 such that, as can be seen from FIGS. 2 and 4, one end area 7' of the rigid guide tube 7, which is connected to the distribution box 4, runs approximately at right angles to the longitudinal axis of the pipe connecting stub 10 and essentially tangentially with respect to the circumference of the pipe connecting stub 10 while, in contrast, the other end area 7", which is connected to the guide element 5, emerges from the pipe connecting stub 10, in its top area, approximately parallel to the longitudinal axis of this pipe connecting stub 10.

The guide element 5 is fixed at the top of the domestic channel line 2 in such a way that this guide element is first of all moved to the desired position by means of suitable aids, after which a flexible cladding tube 12, which is impregnated with a synthetic resin that can be cured (see FIG. 3) is introduced via the pipe connecting stub 10 into the domestic channel line 2. The flexible cladding tube 12 is introduced in such a way that one of its ends is closed in a sealed manner, and such that the flexible tube is filled with a pressure medium, preferably water, so that the flexible tube is forced over and is pressed against the wall of the domestic channel line and against the guide element 5, assuming the position illustrated in FIG. 3. The flexible cladding tube is then heated by supplying heated water to it, as a result of which the synthetic resin is cured and the flexible cladding tube 12 is solidified. As can be seen from FIG. 3, the cross section of the domestic channel line 2 is not reduced significantly during this formation process, so that the outlet for the sewage is not impeded.

The process of drawing the glass fiber cable 3 into the rigid guide tube 3 and into the guide element 5 which is adjacent to it is not carried out until these parts have been installed and fixed.

Figure 3A:
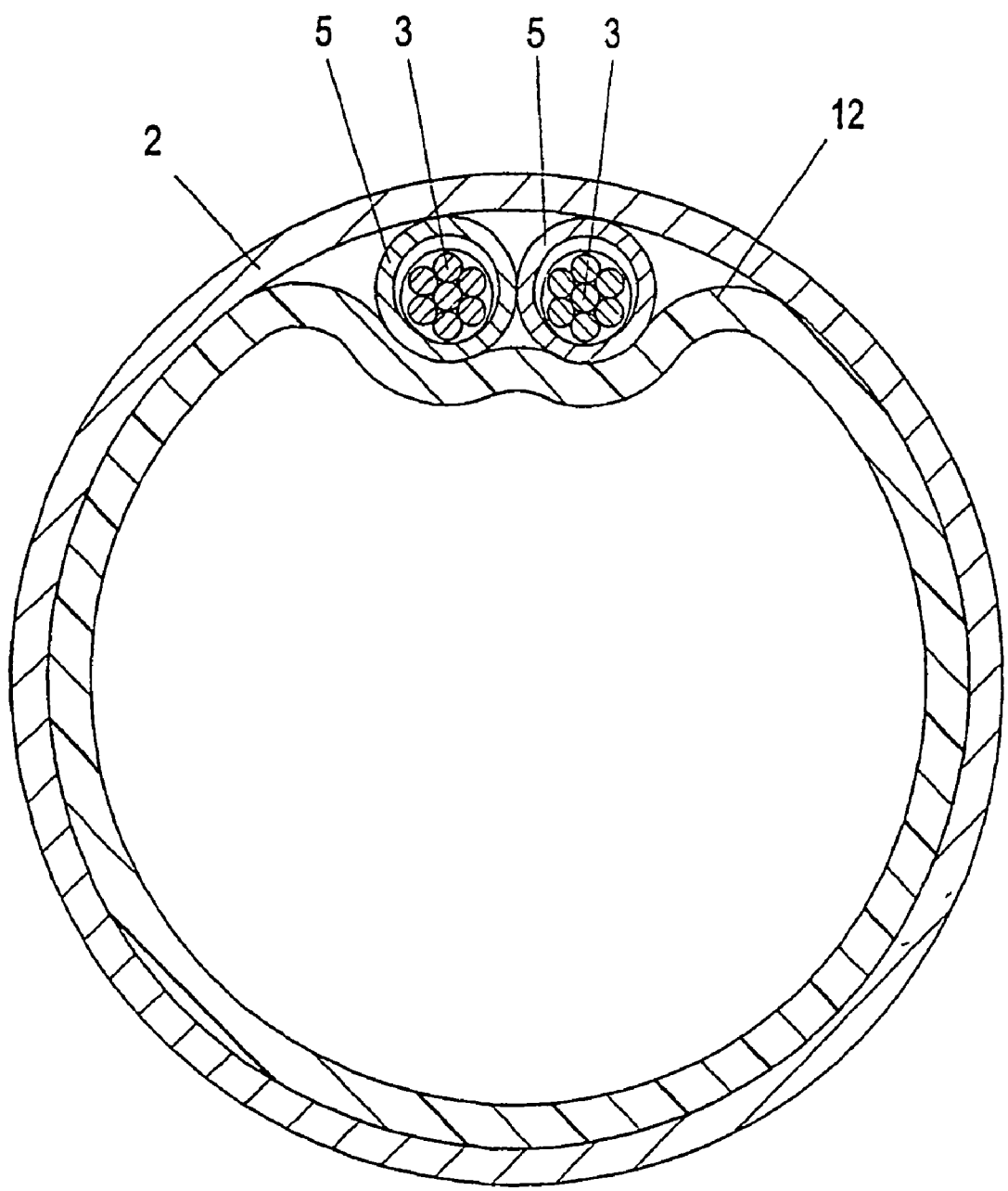
FIG. 3a shows a modified embodiment corresponding to the illustration in FIG. 3.

FIG. 3a shows an embodiment in which two guide elements 5 which run parallel are provided with glass fiber cables 3 located in them. An embodiment such as this has the advantage over the arrangement of two glass fiber cables in a single guide element 5 with a larger cross section that this has a less adverse effect on the flow in the cross section of the domestic channel line 2.

The expression a rigid guide tube 7 should also be understood as meaning a moulding which can be bent only with difficulty, for example a piece of tubing composed of plastic which can be bent only with difficulty.

The guide tube 7 rests on the inner surface of the pipe connecting stub 10 in the inner area of the pipe connecting stub 10.

Figure 2:
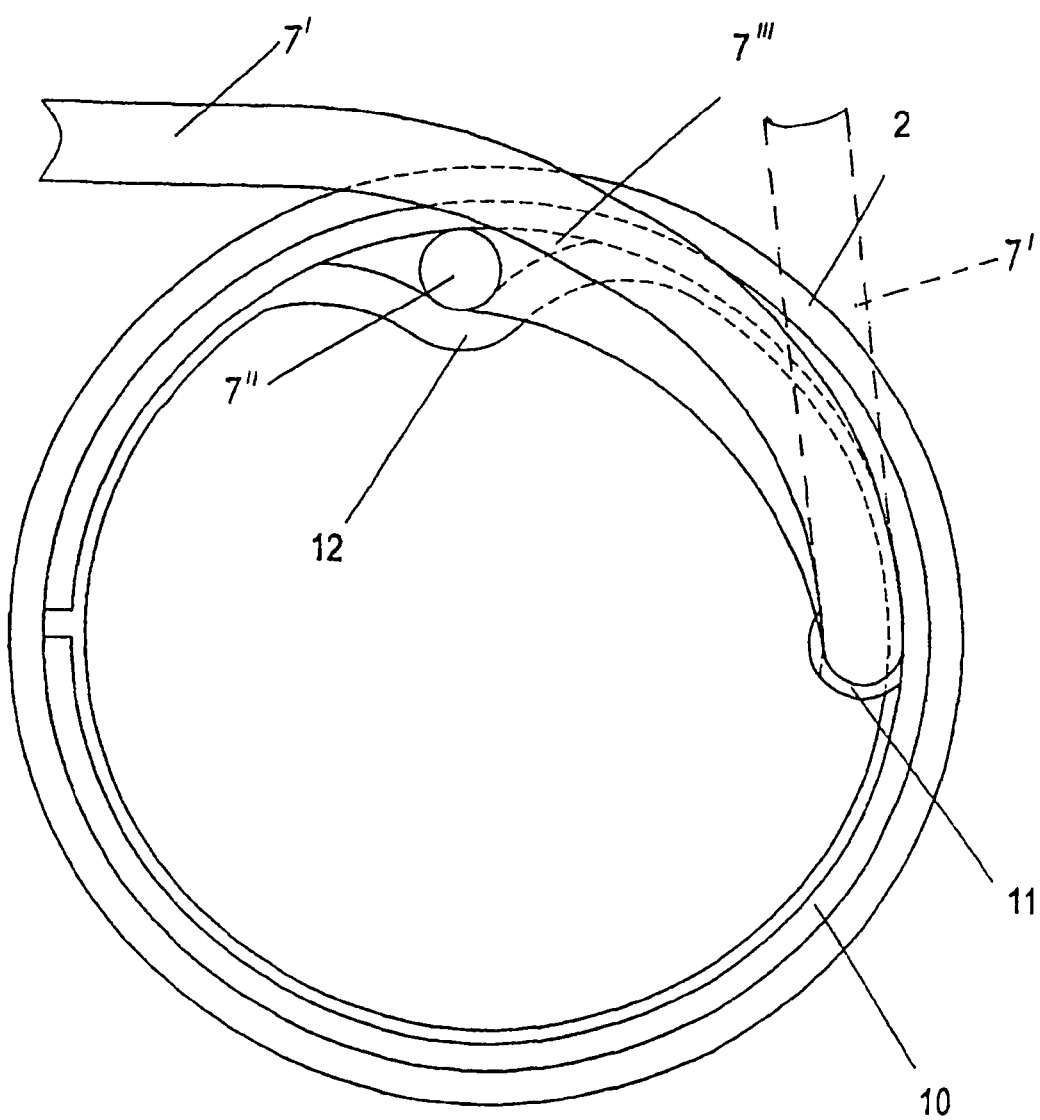
FIG. 2 shows a section along the line II—II in FIG. 1.
Figure 2A:
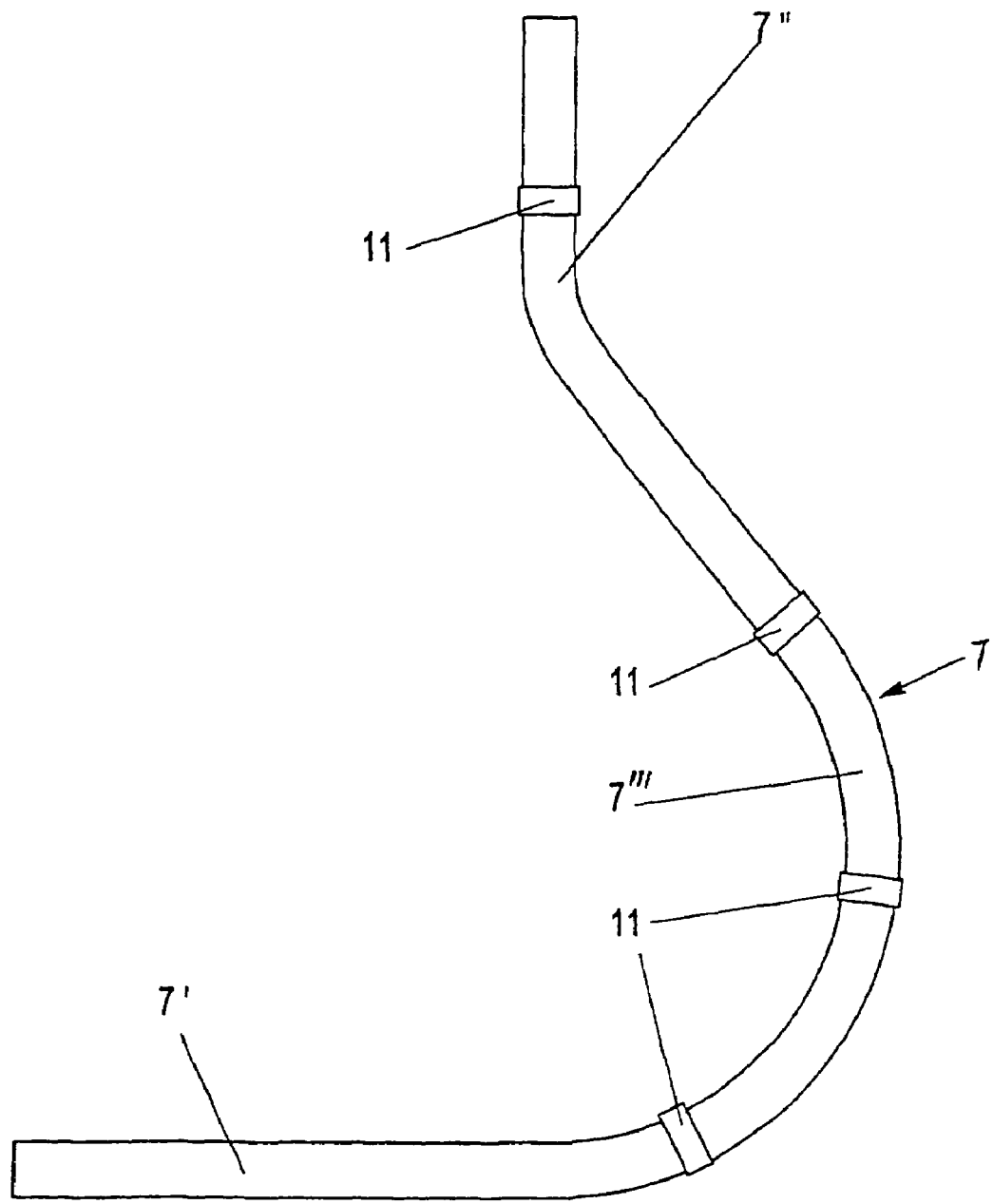
FIG. 2a shows a guide tube for holding the glass fiber cable, on a developed cylindrical envelope.
Figure 4:
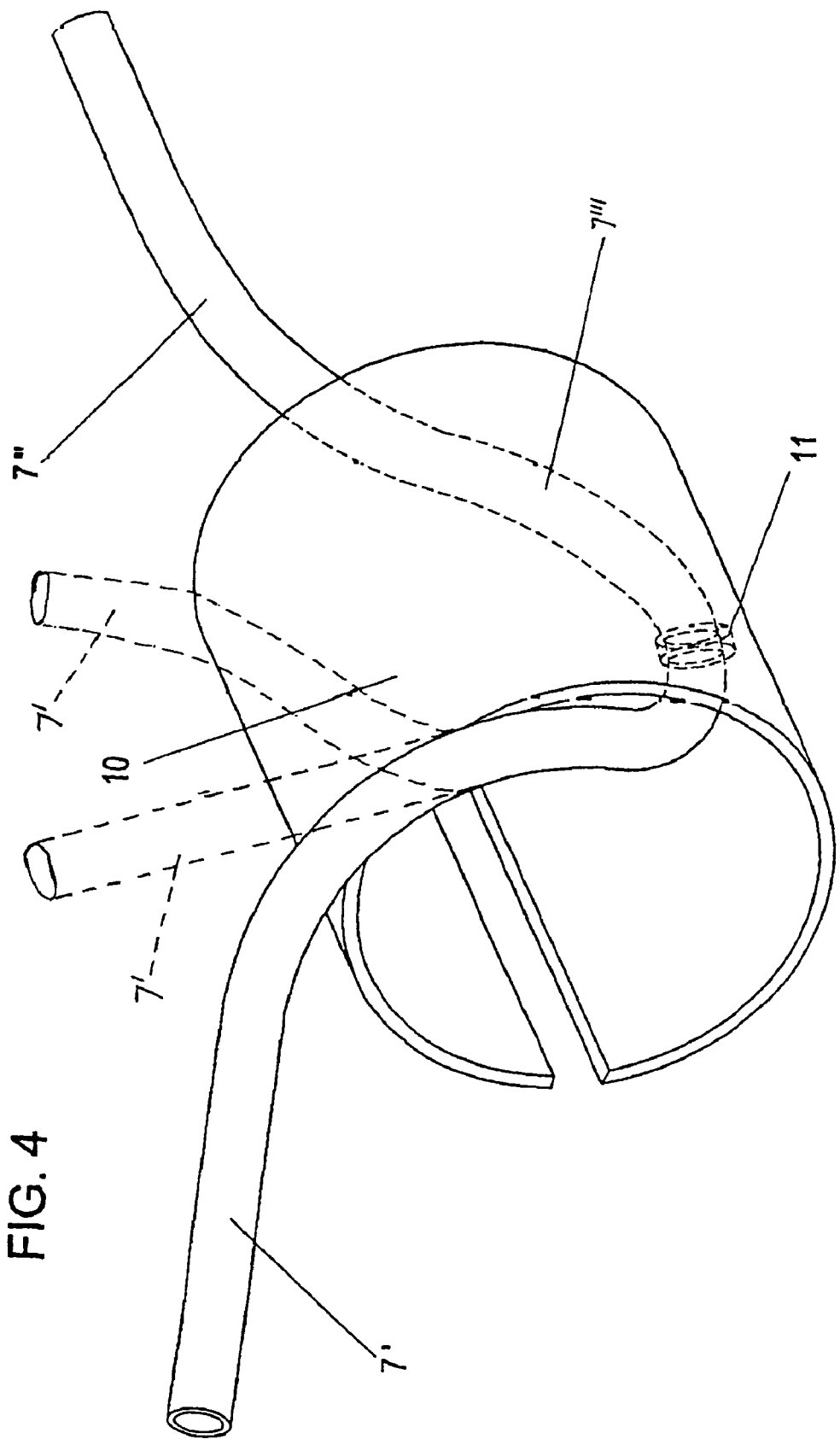
FIG. 4 shows a perspective illustration of the major component of the cable guide according to the invention.

The end area 7' of the guide tube 7 can assume all the intermediate positions between three preferred positions, as illustrated in FIGS. 2 and 4.

The position and alignment of the end area 7' and of the pipe connecting stub 10 in the domestic channel line 2 are matched during insertion of the pipe connecting stub 10 to the profile of the cables which have already been laid, or are to be laid, in the main channel 1. The end area 7' advantageously runs horizontally and opens in the uppermost area of the domestic channel line 2 into the pipe connecting stub 10; the end area 7' can also open into the domestic channel line 2 in the upper area of the side wall of a domestic channel line.

In the area where it opens into the domestic channel line 2 or into the pipe connecting stub 10, the end area 7' is curved in a plane at right angles to the longitudinal axis of the pipe connecting stub 10 and/or in a plane which runs parallel to the axis of the main channel 1, and contains the generatrix of the pipe connecting stub 10.

Within the pipe connecting stub 10, the guide element 5 in the guide tube runs essentially at the top of the pipe connecting stub 10 or of the domestic channel line 2. The connection to the end area 7" is also made in this domestic channel line.

We claim:

1. A cable guide for guiding a cable in a channel system having a main channel and a channel mouth, the cable guide comprising:
   a rigid guide tube holding the cable in a region of the channel mouth, said guide tube having a longitudinal axis extending, at least in a central segment thereof, along a substantially cylindrical envelope surface defined with an axis running in a longitudinal direction of the channel mouth; and
   a flexible guide element connected to an end of said rigid guide tube in the channel mouth and holding the cable in the channel mouth.

2. The cable guide according to claim 1, wherein the cable is a glass fiber cable guided in a sewage channel system.

3. The cable guide according to claim 1, wherein said flexible element is a flexible tube or a flexible pipe.

4. The cable guide according to claim 1, which further comprises a sleeve connecting said end of said rigid guide tube to said guide element.

5. The cable guide according to claim 4, wherein said sleeve is integrally formed on said guide element.

6. The cable guide according to claim 1, which further comprises a pipe connecting stub resting on a wall of the cable mouth, and wherein said central segment of said guide tube extending substantially along the cylindrical surface is attached within said pipe connecting stub.

7. The cable guide according to claim 6, wherein said end of said rigid guide tube extends approximately perpendicularly to a longitudinal axis of said pipe connecting stub.

8. The cable guide according to claim 7, wherein said end of said rigid guide tube extends approximately tangentially with respect to a periphery of said pipe connecting stub.

9. The cable guide according to claim 6, wherein a second end area of said rigid guide tube opposite said end runs approximately parallel to a longitudinal axis of said pipe connecting stub.

10. The cable guide according to claim 6, wherein said pipe connecting stub is configured to be elastically widened.

11. The cable guide according to claim 6, wherein said pipe connecting stub is formed of a metal sheet slotted in an axial direction of said pipe connecting stub.

12. The cable guide according to claim 1, wherein said rigid guide tube is a metal/plastic composite tube.

13. The cable guide according to claim 1, which further comprises attachment devices disposed to attach said rigid guide tube on an inner wall of said pipe connecting stub.

14. The cable guide according to claim 13, wherein said attachment devices include devices selected from the group consisting of clamps and cable ties.

15. The cable guide according to claim 1, which comprises a flexible cladding tube is disposed adjacent said pipe connecting stub, said flexible cladding tube resting on wall of the channel mouth and fixing said guide element thereon.

16. The cable guide according to claim 15, wherein said flexible cladding tube is impregnated with a curable plastic resin.

17. The cable guide according to claim 15, wherein said flexible cladding tube is impregnated with a heat-curable plastic resin.

18. A method for producing a cable guide for a cable to be guided in a channel system, the channel system having a channel extending in a given direction and a channel mouth defining a deflection area, the method which comprises:

inserting a flexible guide element originating from the direction-changing area into the channel mouth;

connecting an end of the guide element to a rigid guide tube having been deformed such that a longitudinal axis in a central segment thereof runs substantially along an imaginary cylindrical surface;

fixing the rigid guide tube on an inside of a pipe connecting stub, and then inserting the pipe connecting stub, with the rigid guide tube affixed, into the channel mouth from the direction-changing area such that the pipe connecting stub rests in a stressed manner on a wall of the channel mouth and the rigid guide tube emerges from the pipe connecting stub into the channel system approximately tangentially at an upper boundary of the pipe connecting stub; and subsequently drawing the cable into the guide tube and the guide element connected thereto.

19. The method according to claim 18, which comprises fixing the rigid guide tube inside a pipe connecting stub configured to be widened elastically.

20. The method according to claim 18, wherein the cable is a glass fiber cable guided in a sewage channel system.

21. The method according to claim 18, wherein the guide element is a flexible pipe or a flexible tube.

22. The method according to claim 18, which further comprises inserting a flexible cladding tube through the pipe connecting stub into the channel mouth, with the flexible cladding tube being pressed against the wall of the channel mouth and against the guide element running along the wall, and fixing the cladding tube in the pressed on position by supplying a pressure medium into the flexible tube interior.

23. The method according to claim 22, which comprises supplying pressurized water as the pressure medium.

24. The method according to claim 22, wherein the flexible cladding tube is impregnated with a curable synthetic resin, and the fixing step comprises supplying a heated medium into the flexible tube interior.

25. The method according to claim 24, wherein the step of supplying a heated medium comprises pumping heated water into the flexible tube.

* * * * *